(12) United States Patent
Simske et al.

(10) Patent No.: US 10,482,417 B2
(45) Date of Patent: Nov. 19, 2019

(54) ITEM IDENTIFIER ASSIGNMENT (71) Applicant: Hewlett-Packard Development Company, L.P., Spring, TX (US)

(72) Inventors: Steven J Simske, Ft. Collins, CO (US); A. Marie Vans, Ft. Collins, CO (US); Malgorzata M Sturgill, Ft. Collins, CO (US); Mark Jacobsen, Galway (IE); Mick Keyes, Dublin (IE)

(73) Assignee: Hewlett-Packard Development Company, L.P., Spring, TX (US)

( * ) Notice: Subject to any disclaimer, the term of this patent is extended or adjusted under 35 U.S.C. 154(b) by 282 days.

(21) Appl. No.: 15/116,164

(22) PCT Filed: Feb. 4, 2014

(86) PCT No.: PCT/US2014/014550
§ 371 (c)(1),
(2) Date: Aug. 2, 2016

(87) PCT Pub. No.: WO2015/119592
PCT Pub. Date: Aug. 13, 2015

(65) Prior Publication Data
US 2017/0076251 A1    Mar. 16, 2017

(51) Int. Cl.
*G06Q 10/08* (2012.01)
*G06K 17/00* (2006.01)
*G06Q 10/06* (2012.01)

(52) U.S. Cl.
CPC ..... *G06Q 10/0833* (2013.01); *G06K 17/0029* (2013.01); *G06Q 10/087* (2013.01)

(58) Field of Classification Search
USPC ........................................... 705/28
See application file for complete search history.

(56) References Cited

U.S. PATENT DOCUMENTS

| | | | |
|---|---|---|---|
| 7,136,832 | B2 | 11/2006 | Li et al. |
| 7,185,317 | B2 | 2/2007 | Fish et al. |
| 7,668,761 | B2 | 2/2010 | Jenkins et al. |
| 8,010,571 | B2 | 8/2011 | Knoblock et al. |
| 2005/0006469 | A1 | 1/2005 | Nonneman et al. |
| 2006/0087407 | A1 | 4/2006 | Stewart |
| 2006/0242104 | A1 | 10/2006 | Ellis et al. |
| 2007/0001006 | A1 | 1/2007 | Schuessler et al. |
| 2007/0057050 | A1* | 3/2007 | Kuhno ................. G06K 19/08 235/383 |

(Continued)

FOREIGN PATENT DOCUMENTS

| CN | 1773526 | 5/2006 |
|---|---|---|
| CN | 104054055 | 9/2014 |

OTHER PUBLICATIONS

"NetVision System in NDC", Nov. 15, 2013; http://www.adnet.hr/wp-content/uploads/2011/09/SustavNetVision-NDC_3-002-en-1.pdf.

*Primary Examiner* — Garcia Ade
(74) *Attorney, Agent, or Firm* — HP Inc. Patent Department (57) ABSTRACT

Examples disclosed herein relate to item identifier assignment. For example, a processor may create a mass serialization scheme to provide a list of item identifiers to allow a subset of the identifiers to be knocked out. Each item identifier may associated with multiple containers, and each container may include two item identifiers relating to the sequence of item identifiers included within the container.

13 Claims, 6 Drawing Sheets

(56) References Cited

U.S. PATENT DOCUMENTS

| | | |
|---|---|---|
| 2007/0126578 A1 | 6/2007 | Broussard |
| 2008/0041944 A1 | 2/2008 | Rowe |
| 2011/0112685 A1* | 5/2011 | Clark .................... G06Q 10/06 700/227 |
| 2012/0013447 A1 | 1/2012 | Simske et al. |

* cited by examiner

ITEM IDENTIFIER ASSIGNMENT

BACKGROUND

Mass serialization involves creating identifiers to be associated with different items. For example, items in a supply chain may be tagged with unique identifiers. The identifiers may be used to track the movement of the items within the supply chain. For example, identifiers may be scanned to confirm a package arrived in a warehouse or was delivered to a customer.

BRIEF DESCRIPTION OF THE DRAWINGS

The drawings describe example embodiments. The following detailed description references the drawings, wherein:

FIG. 38 is a block diagram illustrating one example of a relationship between a sequential set of item identifiers.

DETAILED DESCRIPTION

In one implementation, mass serialization is applied to objects in a supply chain in a manner that allows serial numbers to be removed from the system while preserving the mass serialization relationships. For example, in a supply chain, an item may be knocked out (and result an item identifier associated with the physical item being removed from the system) when an item with one of the assigned serial numbers is not part of a shipped group in a supply chain, such as because of failing inspection, damage to the identifier, or other reasons for removal. Resetting a model each time an identifier is knocked out may be costly, and in some cases impossibly where the equipment in the assembly line does not allow the remodel to be reset. Identifiers may be assigned in a manner that maintains relationships between items and between items and containers despite some previously assigned identifiers being removed from the system.

A mass serialization instantiation may provide a sequential list of item identifiers to allow a subset of the identifiers to be knocked out such that each item identifier is associated with multiple containers. An item identifier may relate to multiple container identifiers such that there are multiple options for containers for the item. The options may allow an item to be assigned either to a first container or a second container. For example, an item originally to be assigned to a first container may be assigned to a second container when an item to be assigned to the second container is knocked out. In addition to a container identifier, each container may include two identifiers relating to the items associated with the container. For example, the item identifiers associated with the container may be identifiers prior to and after a sequential list of item identifiers of items included within the container.

Figure 1:
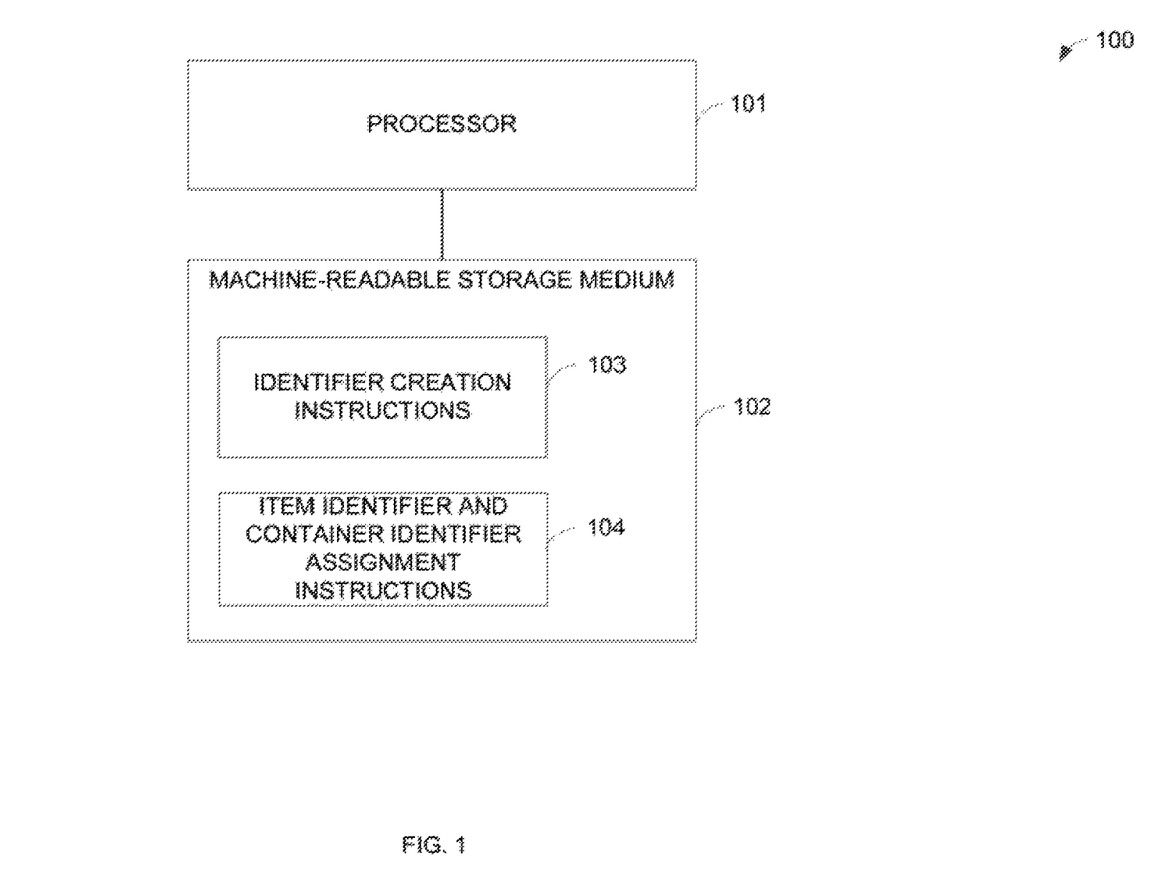
FIG. 1 is a block diagram illustrating one example of a computing system to assign an item identifier.

FIG. 1 is a block diagram illustrating one example of a computing system to assign an item identifier. For example, the computing system 100 may create a mass serialization instantiation. Mass serialization (MS) may be used to assign identifiers, such as serial numbers, to items. In some cases, the mass serialization may be used for multiple levels of items, such as an object within a package within a carton. The relationship between the identifiers may be preserved at each level, such as an item identifier associated with an object, with a package container and a package item identifier associated with a package with a carton container. There may be a bi-directional relationship, such as where a carton also relates to a package with relates to an item. An inference relationship may exist between nested objects, such as for A included within B included within C included within D, the relationship of the identifier sets may be $\{D\} \leftarrow \{C\} \leftarrow \{B\} \leftarrow \{A\}$.

The computing system 100 includes a processor 101 and a machine-readable storage medium 102. The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other memory capable circuits that comprise a plurality of electronic components for performing the functionality described below. The functionality described below may be performed by multiple processors.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include instructions executable by the processor 101. For example, the machine-readable non-transitory storage medium 102 may include identifier creation instructions 103 and item identifier and container identifier assignment instructions 104.

The identifier creation instructions 103 may include instructions to create a sequential set of identifiers to be associated with items, such as items in a supply chain. For example, a mass serialization instantiation may be created with an identifier for a container and a set of sequential identifiers for items to be included within the container. The relationship may involve multiple levels of containment, such as where an object is within a package placed in a carton and loaded onto a crate. Items of the same level, such as objects within a package, may have a sequential list of item identifiers. In one implementation, there is a forward relationship of the identifiers, such as where a comparison of information related to two consecutive identifiers is indicative of the next consecutive identifier. In one implementation, a similar process may be performed for other levels, such as creating a list of consecutive identifiers for items and creating a list of consecutive identifiers for containers.

The list of item identifiers may be associated with a container that includes the items. The container may be any suitable object for including the items, such as a carton, crate, or other container. The relationship between an item and container may be at any level of a nested supply chain of items and containers. If an item identifier does not correctly relate to the identifier of the container that includes the item, the item and/or container may be flagged as being potentially counterfeit. Each item identifier may be associated with multiple containers such that if one identifier is missing due to knockout, there is another available identifier that may also properly relate to the container. In one implementation, information about the relationship between items and their containers is stored in a database. In one implementation, the relationship is preserved through a relationship between the item and container identifiers. The consecutive list of item identifiers may each include a portion of the identifier that is used to relate the item identifier to a container identifier. For example, the first five bits may be the initially created item identifier and the last two bits may be added to preserve a relationship between the item and the two containers that the item may be associated with.

The item identifier and container identifier assignment instructions 104 include instructions to assign the identifiers to items. The items may be included within a container, such as a carton, crate, or other type of container. The item may be a container included within another container, such as a carton item within a crate container. The item identifiers may be nested between a beginning and ending identifier that may be associated with the container. For example, the container may have a container identifier and a beginning and ending item identifier. The first item identifier may be assigned to the container, the next consecutive identifiers may be assigned to each of the items in the container, and the next consecutive identifier after the identifier assigned to the items may be assigned to the container.

The identifiers may be printed on packaging, such as in the form of a barcode identifier or to other technologies, for example, as a near-field tag or RFID tag. The identifiers may be scanned at different stages of the supply chain to ensure the presence of the expected items. The scanning process may reveal instances when an item is missing and in some cases reveal the identifier associated with the missing item. For example, where a known number of items are packaged in a container, if the beginning and ending identifier indicate that there are more identifiers between the beginning and ending identifiers than the known number of items that are packaged in a container, then the set of identifiers may be flagged as having an identifier missing where an item was knocked out. On closer examination, the identifiers of the items in the container may be analyzed by the processor 101 or another processor to determine which identifier is missing.

Figure 2:
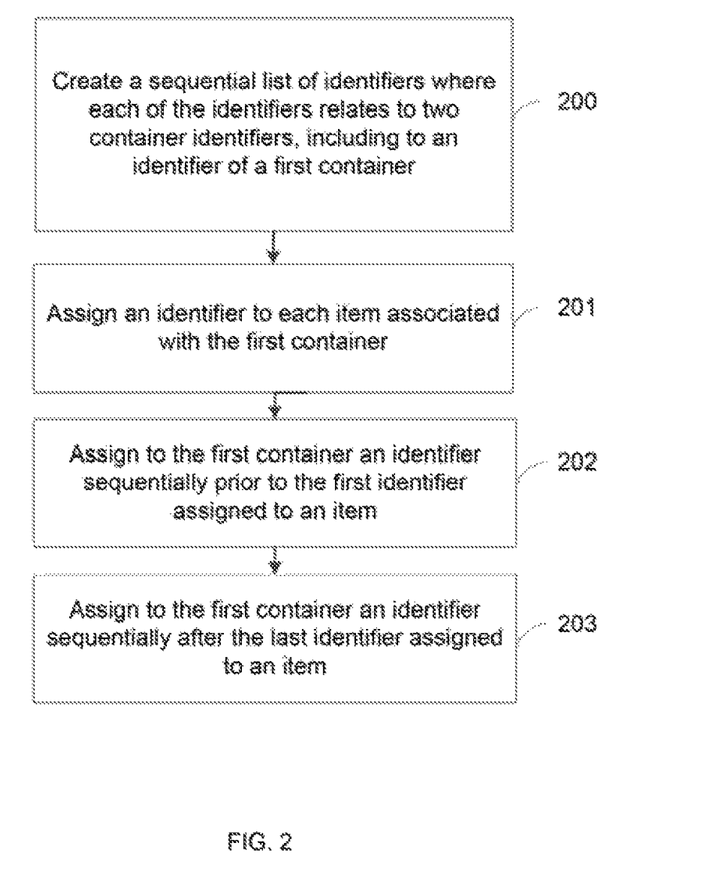
FIG. 2 is a flow chart illustrating one example of a method to assign an item identifier.

FIG. 2 is a flow chart illustrating one example of a method to assign an item identifier. The identifier may be part of a mass serialization instantiation to serialize items in a supply chain. The identifier may be assigned in a manner that allows for an item to be knocked out without breaking the serialization relationships. The assignment method may allow for missing identifiers and the identification of the missing item identifier to be determined. For example, the identifier may be used to identify the item, and in some cases, the identifier may be used to indicate the relationship of the item to other items and to a container that includes the item. The identifier may be associated with an electronically readable identifier, such as a barcode, a near-field tag, and an RFID tag. For example, the tag may be scanned to determine a serial number of the item. The method may be implemented, for example, by the processor 101 of FIG. 1.

Beginning at 200, a processor creates a list of sequential identifiers where each of the identifiers relates to two container identifiers, including to an identifier of a first container. The identifiers may be, for example, binary strings. The item and container may be any nested objects within a supply chain where an item is included in the container. The same method may be used for multiple levels. For example, the method may be used to create identifiers for packages within cartons and to create identifiers for cartons within crates.

Figure 3A:
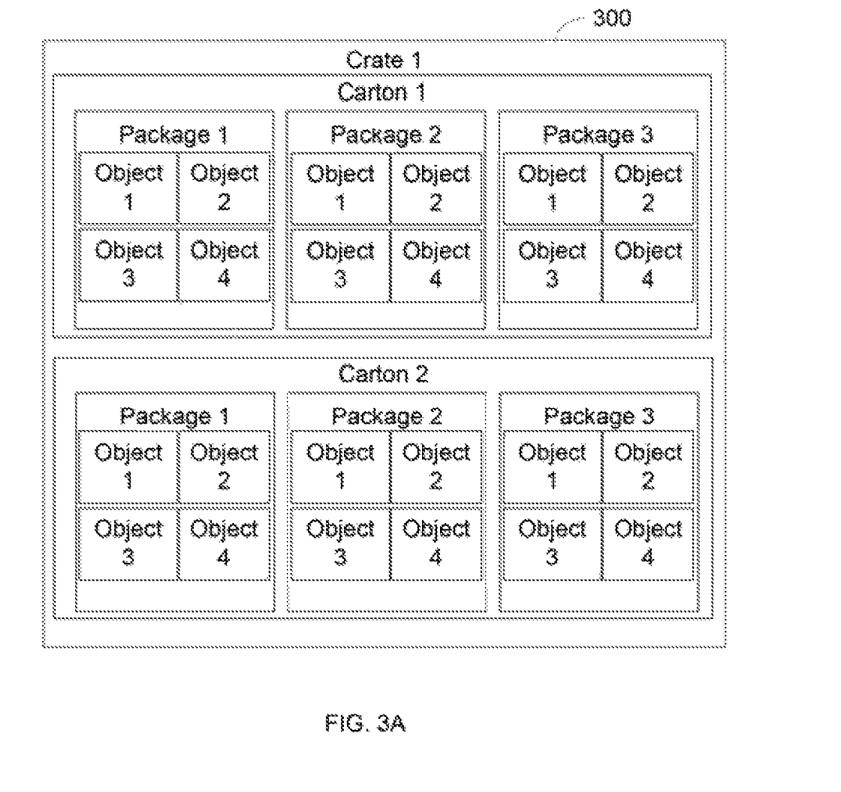
FIG. 3A is a block diagram illustrating one example of containers in a supply chain nested within one another.

FIG. 3A is a block diagram illustrating one example 300 of containers in a supply chain nested within one another. For example, objects are included within packages which are included within cartons which are included on a crate. There are four objects within a package, three packages within a carton, and two cartons within a crate. The method may be applied recursively. For example, the same method may be used for assigning container identifiers as for assigning item identifiers, such as where a container also represents an item in another container in a nested supply chain. A package may both include object items and may represent an item within a carton container.

In one implementation, the item identifiers are consecutive in a manner such that the items relate to one another in a sequential manner. For example, a tag associated with an identifier may include additional information. In one implementation, the identifier includes multiple fields within a binary string identifier, such as where a particular number of bits relates to the identifier and another set of bits relates to a field indicating a relationship to another identifier in the list. In one implementation, the identifier includes a forward field to relate to a sequentially consecutive identifier and a reverse field to relate to a previously assigned identifier. For example, a reverse field of an item identifier may relate to a combination of information related to the forward field of the two previous item identifiers.

Figure 3B:
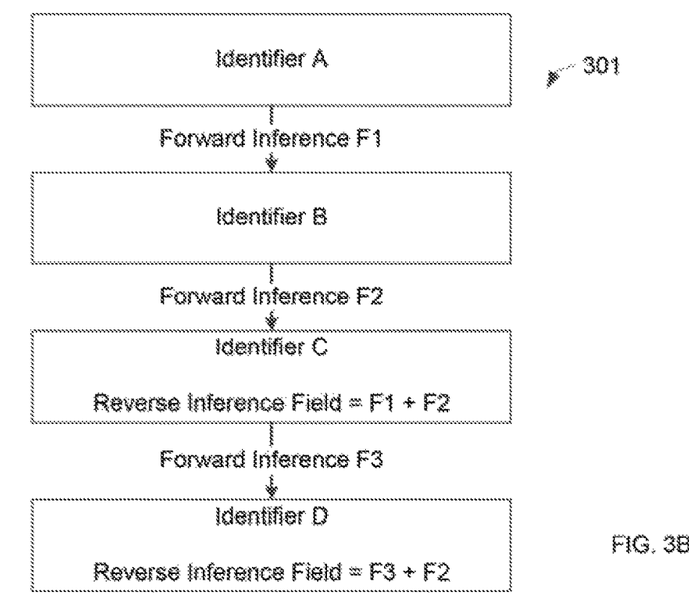

FIG. 3B is a block diagram illustrating one example 301 of a relationship between a sequential set of item identifiers. For example, the item identifiers may be sequential from A to D. A forward inference indicates a forward distance between identifiers, such as a distance F1 from identifiers A to B and a forward inference F2 between identifiers B and C. A reverse field identifier for identifier C may indicate a relationship between identifiers A and B. If the relationship does not hold true, then the group may be flagged as potentially including a knocked out identifier. In some implementations, the relationship may be used to determine the identifier associated with a knocked out item.

An identifier may relate to a container such that it is possible to determine whether an item identifier is properly related to a container identifier. In one implementation, an identifier may be capable of being assigned to a first or a second container. For example, an item identifier Y may be assigned to container 1 or 2. If an item with item identifier X to be included in container 1 is knocked out, an item with item identifier Y may be assigned to a new item to be placed in container 1. If there is no knockout, the item identifier Y may be assigned to container 2. In other words, for sets of item identifiers $\{I\}_x$ and sets of container identifiers $\{C\}_x$ where $\rightarrow$ indicates an inferential relationship:

$$\{I\}_1 \rightarrow \{C\}_1 \text{ and } \{I\}_2 \rightarrow \{C\}_1$$

$$\{I\}_2 \rightarrow \{C\}_2 \text{ and } \{I\}_2 \rightarrow \{C\}_3$$

To allow x+1 items to legitimately be associated with x containers:

$$\{I\}_{x-1} \rightarrow \{C\}_{x-1} \text{ and } \{I\}_x \rightarrow \{C\}_{x-1}$$

$$\{I\}_x \rightarrow \{C\}_x \text{ and } \{I\}_{x+1} \rightarrow \{C\}_x$$

A relationship between an item and container may be used for supply chain purposes to determine whether the items in a container are properly associated. The items may be associated based on a relationship in a database. For example, items may be specifically associated with a container in a database and/or a mathematical relationship between an item identifier and a container identifier may be stored in a database, such as where a container identifier for a container including item with identifier X is the digital signature of X or where the container identifier for a container including item with identifier X is a scrambling method of the item identifier X.

In one implementation, the relationship between item identifiers and container identifiers is related to a relative relationship between the identifiers. For example, an item identifier may include a code portion to associate the item identifier with the container identifier. The code portion may be an addend at the end of the item identifier that creates a particular type of relationship between a container identifier and an item identifier. The difference between the item identifier and container identifier may be analyzed to determine if the two are related.

In one implementation, the identifiers move forward from item to container such that a 0 in a binary string identifier moves to a 1. For example, an item identifier may have fewer 1's than a container identifier. In one implementation, the level of the identifier is determined based on the number of 1's, such as where item identifiers include six 1's and where container identifiers include ten 1's. The relationship between the item identifier and a container identifier for a container including the item may be for item identifier I, container identifier C, and addend A:

$$I+A=C.$$

$$I\&A=0,$$

$$I\&C=I, \text{ and}$$

$$A\&C=A$$

As an example, the relationships may be preserved where I=10000101, C=11001101, and A=01001000. The addend A may allow for the data sets for item identifiers and the data sets for the container identifiers to be non-colliding unless the addend of A is exactly 0 (A=0 above). To prevent collision between the item and container identifiers, the processor may enforce a rule that the addend include a minimum number of 1's. In some implementations, the addend may include a specific number of 1's in the binary string, and the position of the 1's may be moved to create the relationship with the container identifier.

In one implementation, a statistical distance is preserved between identifiers of the same set, such as to create a non-colliding set of item identifiers. For example, a Hamming distance between a first identifier and the next consecutive identifier may be determined. The second identifier may be recomputed where the Hamming distance is less than a threshold. As an example, the Hamming distance may be determined by the sum of the number of 1's in a binary string identifier resulting from an XOR operation between two consecutive binary identifier strings. A statistical difference may also be enforced between different levels, such as between item identifiers and container identifiers. The Hamming distance (HD) may be determined for $BS_n$ in a set of identifiers, such as item identifiers for string indices j by the following:

$$HD = \Sigma_{j=1}^{length\ BS_1 = length\ BS_2} BS_1 \text{ XOR } BS_2(j)$$

The relationship between the items and containers may provide a number of extra identifiers to allow for a particular number of items to be knocked out before the serialization model is compromised. The number of extra identifiers may be created in relation to how many extra item identifiers are capable of being associated with each container identifier. The number of extra identifiers may be different for different supply chains or vendors. For example, a product with a lot of items failing quality inspections may include more extra item identifiers so that more may be knocked out while preserving the integrity of relationships between items, item groups, and containers. Fewer extra identifiers may be created where knockout occurs less frequently.

Figure 3C:
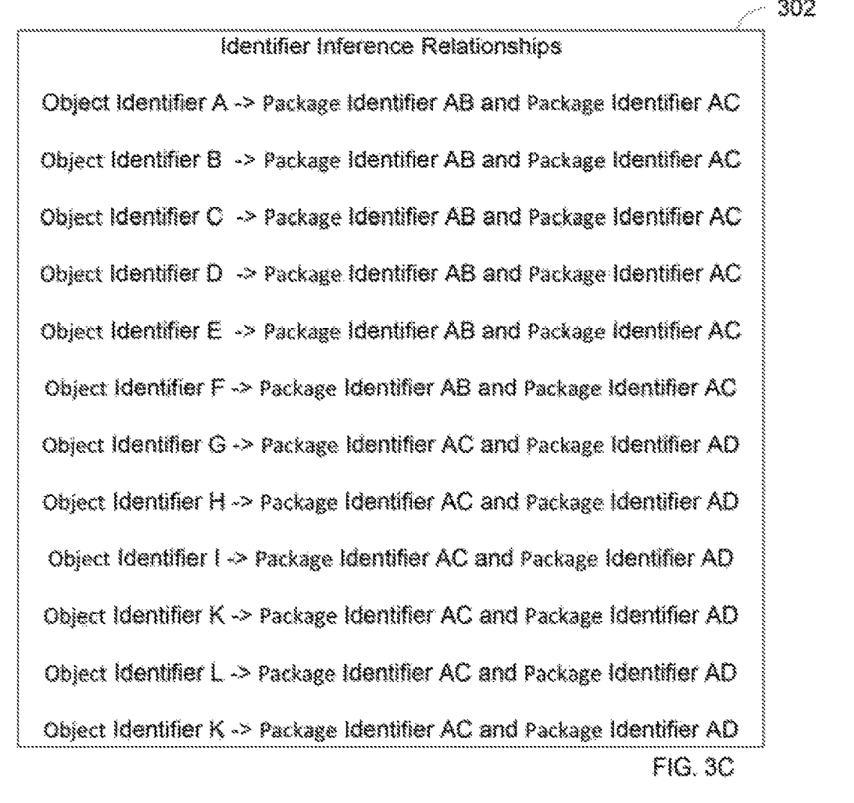
FIG. 3C is a block diagram illustrating one example of providing extra item identifiers.

FIG. 3C is a block diagram illustrating one example 302 of providing extra item identifiers for mass serialization. For example, six extra identifiers are provided such that six identifiers are associated with two containers. The item identifiers (object identifiers) may be sequential from A-R and the container identifiers (package identifiers) may be sequential from AA-AD. For example, the first six identifiers are associated with a first and second container, and the next six identifiers are associated with the second container and a third container, if an item with identifier B is knocked out from the container with identifier AB, item with identifier E may be associated with the container identifier AB instead of AC.

Figure 3D:
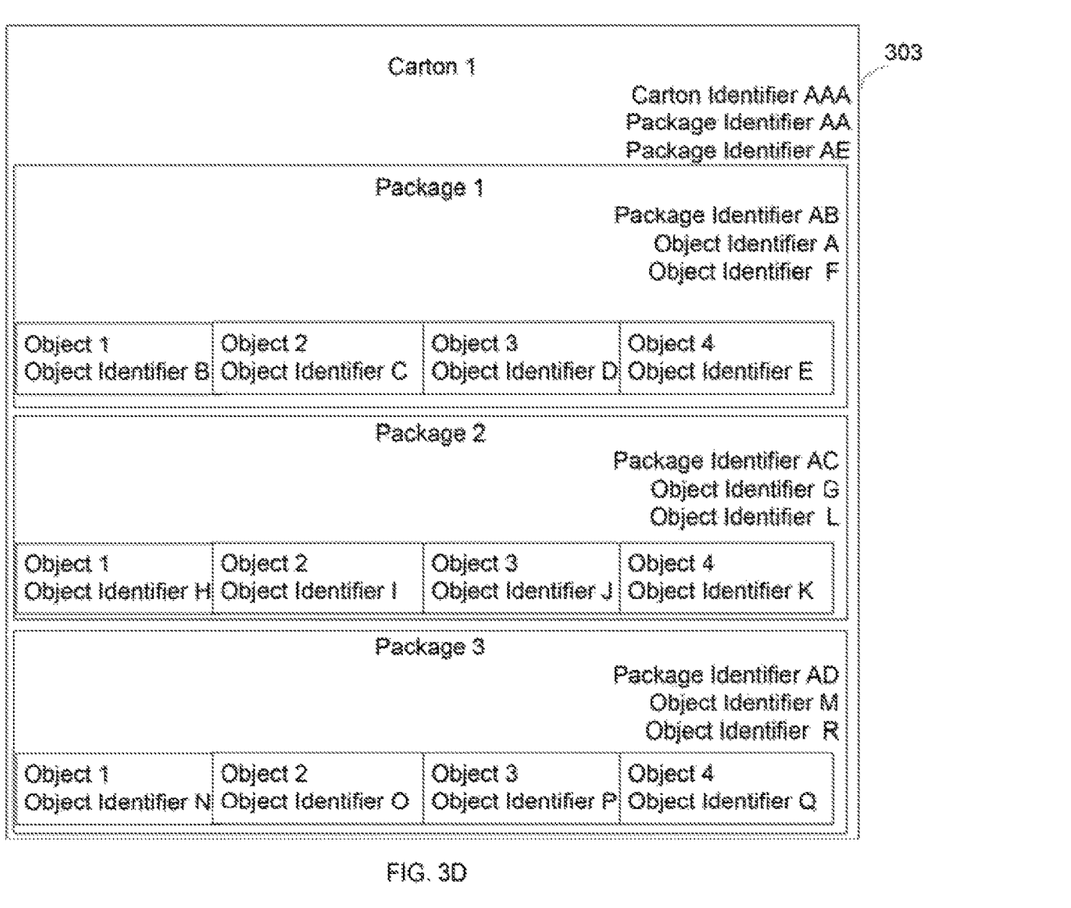
FIG. 3D is a block diagram illustrating one example of assigning item identifiers.

Referring back to FIG. 2 and moving to 202, the processor assigns to the first container an identifier sequentially prior to the first identifier assigned to an item. FIG. 3D is a block diagram illustrating one example 303 of assigning item identifiers to items. The sequential item identifiers (object identifiers) are A-R. For package 1, the first sequential identifier, identifier A, is assigned to package 1. For example, package 1 has a package identifier and a beginning and ending object identifier.

Referring back to FIG. 2 and continuing to 201, the processor assigns an identifier to each item associated with the first container consecutively. For example, the next N identifiers may be assigned to the N items in the container. As shown in FIG. 3D, package 1 includes objects sequentially tagged with identifiers B, C, D, and E, and package 2 includes objects sequentially tagged H, I, J, and K.

Referring back to FIG. 2 and proceeding to 203, the processor assigns to the first container an identifier sequentially after the last identifier assigned to an item. For example, for package 1 in FIG. 3O, the last object identifier is E and the consecutive object identifier F is assigned to package 1 as the ending object identifier.

The item identifiers associated with the container may have any suitable relationship to indicate an encapsulation of the item identifiers within the container. For example, the item identifiers may be consecutive. In some cases, there may be a mathematical relationship between the item identifiers where the item identifiers associated with the container indicate a position prior to and after the item identifiers of items included within the container.

The concept of a beginning and ending identifier may be used on different levels of the serialization. For example, a package may include an item beginning and ending identifier for object within the package, and a carton may include a beginning and ending identifier for packages within the carton. The same relationship may continue for as many levels of containment as exist in the supply chain. The number of identifiers for the system to create for a particular item may be determined based on one identifier for each item of each level and 2 additional identifiers for each level of containment times the number of containers at each level of containment. For example, for M total levels of containment, n(j) items at each level, and i sets at each level, the processor may determine the number of identifiers based on the following:

$$\Pi_{j=A}^{M}n(j)+2*\Sigma_{i=b}^{M}\Pi_{j=i}^{M}n(j)$$

Figure 3E:
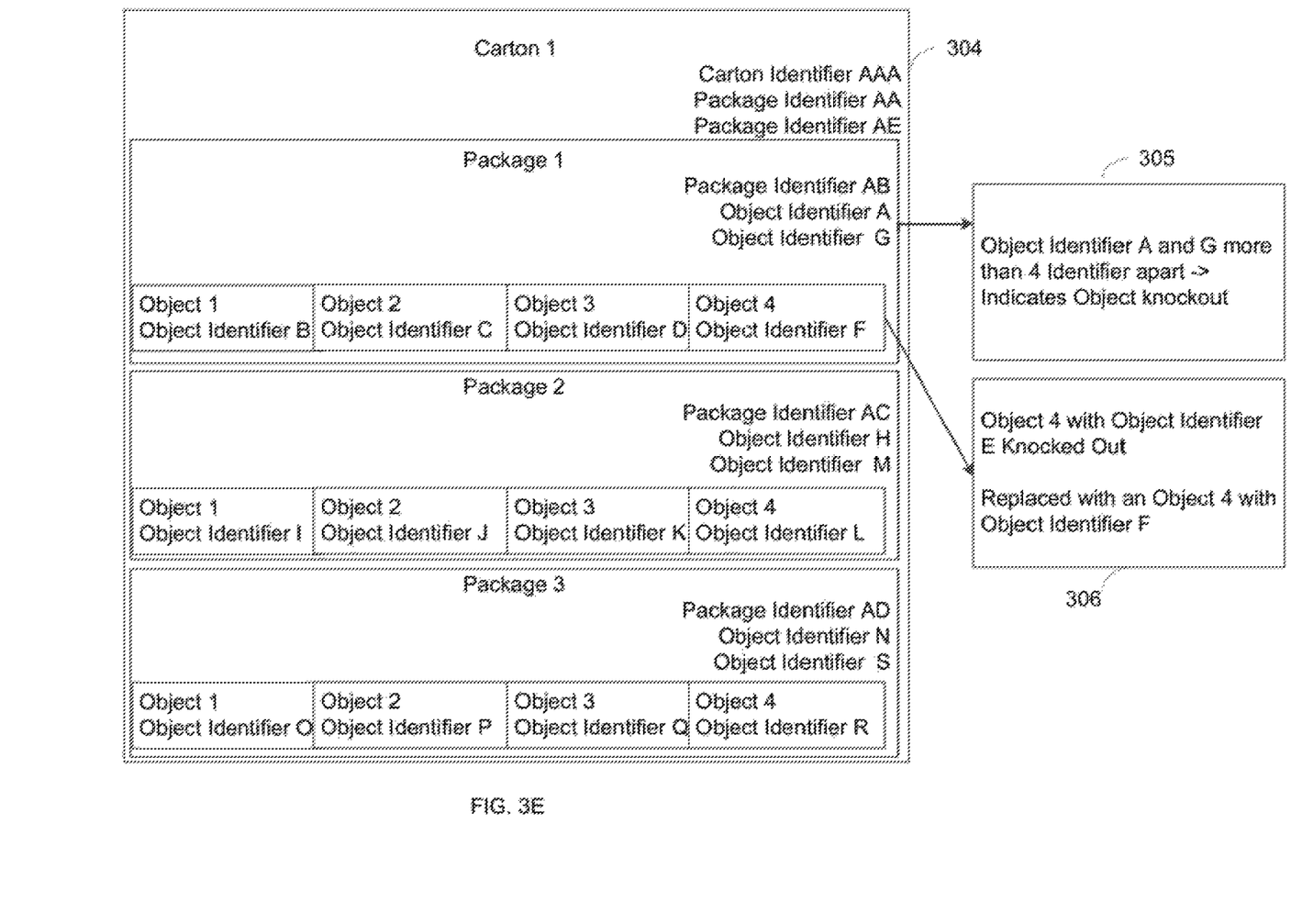
FIG. 3E is a diagram illustrating one example of altering item identifiers when an item is knocked out of a supply chain.

FIG. 3E is a diagram illustrating one example of altering item identifiers when an item is knocked out of a supply chain. For example, block 304 shows a container with three packages with each package having four objects. Block 305 shows the object identifiers on package 1 examined to reveal that the two identifiers are more than four indices apart, indicating a knocked out object identifier. Block 306 shows knocked out object identifier E replaced with object identifier F. Once an occurrence of a knocked out identifier is identified in the package, the individual identifiers may be examined to determine which identifier was knocked out. This may be used to look for counterfeit serial numbers. In one implementation, a knockout registry is created to store knocked out identifiers.

in one implementation, an incremental information object (IIO) is used to provide identifiers to the different objects. For example, a progressive barcode (one incarnation of an IIO) may be used as an identifier. As a first step, the number of bits used for the identifiers may be determined. For example, for a progressive barcode the number of bits per module may be multiplied by the number of modules to get the total bits available in a progressive barcode.

Equal x and y dimensions may be determined from the number of bits used.

A progressive barcode may include multiple fields of data. The different fields of the data may be distributed across the binary string represented by the barcode as opposed to sequentially. The fields may be, for example, a seeding field, an initiation field, a progression field, a completion field, and a preservation field. The binary strings may be created in a non-colliding manner such that no two strings of different levels are the same (ex. no item identifier and container identifier are the same), and that there is a statistical distance between each of the identifiers in a group (ex. a statistical distance between two consecutive item identifiers). The statistical distance may be determined using a Hamming distance and selecting binary strings with a Hamming distance above a threshold, such as greater than 1. The length, location, and other information related to the fields, such as whether a digital signature is used, may be determined before taking into account the content of the individual fields.

The seeding field may be used to distinguish related items from non-related items. The seeding field may be used as a non-colliding workflow identifier, such as to identify a particular serialization instantiation. The seeding values may be [000 . . . 0] to [111 . . . 1], providing $2^n$ possible values. The seeding bits may be the 1's in the binary string, making the number of possible seeding field values where the length of the field is t and the number of 1's in the related group is S:

$$\text{Number of Possible Seeds}=L!/[(L-S)!S!]$$

For example, the length of the field may be 256 bits, and the number of seeding bits may be 5. The number of seeding bits may be used to identify the class of the workflow, such as where item identifiers have 5 seeding bits and container identifiers have 10 seeding bits. A subgroup of item identifiers that are related may have the same value for the seeding field that distinguishes them from other subgroups of item identifiers with a different value for the seeding field.

An initiation field may be used represent an initial identifier of a workflow. It may include a field to identify the object and a field to represent the relationship of the object to the next object. For example, an item may have an identifier field and a forward inference field to represent the forward relationship between the identifier and the next identifier. The identifier field may be half populated with half 0's and half 1's. The item identifiers may be linked through a reverse field. For example, two consecutive forward inference fields may indicate a reverse field. As an example, the relationship may be:

$$F_n \text{ OR } F_{n+1}=R_{n,n+1}, \text{ such as where}$$

$$F_n=[1000101000001000]$$

$$F_{n+1}=[0000010010110000], \text{ and}$$

$$R_{n,n+1}=[1000111010111000]$$

The Hamming distance between two consecutive inference fields may be checked to ensure that it is above a threshold. The Hamming distance may be determined between two forward inference fields, for example, by the sum of the 1's in the combined forward inference fields, such as 8 for $F_n$ and $F_{n+1}$ above.

A processor may determine a preferred statistical distance between forward inference fields and a preferred length of the forward inference field based on a preferred number of potential forward inference fields ($N_F$) where the number of preferred potential forward inference fields is based on the number of identifiers for the system. The number of potential forward inference field values at a given level of containment (ex. between item identifiers) where L is the length of the field and N is the number of 1's may be determined by.

$$N_F=L![(L-N)!N!]$$

A processor may determine the number of potential combinations of $F_n$ and $F_{n+1}$ as the sum of all combinations of sets with the particular number of 1's between $N_F$+HD (where HD represents the Hamming distance) and $2*N_F$, multiplied by all the different ways to provide the particular number of 1's with 2 independent forward inference fields of length L. Maximizing the number of combinations while maintaining a statistical distance between the combinations may occur where the Hamming distance=$0.5*N_F$. If p is the percentage of 1's in the forward inference field, the expected value of the final percentage of 1's for two forward inference binary strings added (logical OR) together is equal to $2p-p2$. Because $2p-p^2=0.5$ when p=0292893, the number of potential combinations ($N_F$) may be maximized where $N_F/L$=0.292893 and HD/L=$(0.5*N_F)/L$=0.146547.

In some cases, the mass serialization may include a progression workflow represented by a progression field that may be included in the incremental information object. The progression workflow may be similar to the initiation identifiers, such as by having an entropy field, forward inference field, and a reverse inference field.

The list of identifiers may complete with a completion entropy field, which may be the same as the initiation entropy field and/or progressive entropy field and a terminal reverse inference field. The terminal reverse inference field may be the identifier in the last container, such as for crate 1 in FIG. 3A.

In some cases, a preservation process may be applied to the binary string identifiers. For example, it may be used to distinguish one set of related items from another. It may be applied for aesthetic reasons, such as to leave some 0's in a progressive barcode. The preservation process may be applied by adding a preservation field to the binary string identifier.

Any suitable type of identifier, such as an incremental information object implemented as a progressive barcode, may be used to create a mass serialization system allowing for identifiers to be removed without compromising the mass serialization system. The identifiers may be printed on objects within a supply chain to add a level of security to help authenticate legitimate objects and to identify potentially counterfeit objects in the marketplace.

The invention claimed is:

1. A computing system, comprising:
   a processor; and
   a memory storing instructions that are executable to cause the processor to:
     create a set of sequential item identifiers for a first container and items to be included within the first container;
     assign the item identifiers to the first container and the items to be included in the first container by assigning a first item identifier in the sequential item identifiers to the first container, assigning next item identifiers subsequent to the first item identifier in the sequential item identifiers to the items to be included in the first container, and assigning a last item identifier in the sequential item identifiers to the first container, wherein each of the item identifiers in the set of sequential item identifiers relates to the first container and a second container;
     physically attach the assigned item identifiers to the first container and the items, and cause the items to be placed in the first container;
     determine a total number of items supposed to be in the first container based on the first item identifier and the last item identifier of the first container;
     compare the total number of items supposed to be in the first container to a total number of items present in the first container to determine whether any item is missing from the first container; and
     in response to a determination that one of the items is missing from the first container, attach a new item identifier to a new item and cause the new item to be placed in the first container to replace the missing item.

2. The computing system of claim 1, wherein the processor is to assign one of the item identifiers, previously assigned to one of the items in the first container, to the second container if the item in the first container is knocked out of a supply chain.

3. The computing system of claim 1, wherein the instructions are executable to cause the processor to create a container identifier for the first container, and store information about a relationship between the set of sequential item identifiers and the container identifier in a database.

4. The computing system of claim 1, wherein, to physically attach the item identifiers to the items, the processor is to cause the item identifiers to be printed on packaging of the items.

5. The computing system of claim 1, wherein the processor is to determine the item identifier assigned to the missing item and use the determined item identifier for an item to be included in the second container.

6. A method, comprising:
   creating, by a processor, a list of sequential item identifiers, wherein each of the item identifiers relates to two container identifiers, including to a first container identifier of a first container;
   assigning, by the processor, a first item identifier in the sequential item identifiers to the first container;
   assigning, by the processor, next item identifiers subsequent to the first item identifier in the sequential item identifiers to items to be included in the first container;
   assigning, by the processor, a last item identifier in the sequential item identifiers to the first container;
   physically attaching, by the processor, the assigned item identifiers to the first container and the items and causing the items to be placed in the first container;
   determining, by the processor, a total number of items supposed to be in the first container based on the first item identifier and the last item identifier of the first container;
   comparing, by the processor, the total number of items supposed to be in the first container to a total number of items present in the first container to determine whether any item is missing from the first container; and
   in response to a determination that one of the items is missing from the first container, attaching, by the processor, a new item identifier to a new item and causing the new item to be placed in the first container to replace the missing item.

7. The method of claim 6, further comprising:
   creating a first container identifier for the first container; and
   storing a relationship between the item identifiers and the first container identifier in a database.

8. The method of claim 7, further comprising:
   creating the first container identifier by adding a code at an end of an item identifier assigned to a first item in the first container in order to associate the item identifier assigned to the first item with the first container identifier.

9. The method of claim 6, wherein the item identifiers include a forward inference field to relate to upcoming codes and a reverse inference field to relate to a previously assigned identifier.

10. The method of claim 6, wherein the item identifiers include reverse inference information indicating a relationship with two previous item identifiers.

11. The method of claim 6, wherein the list of item identifiers includes a statistical distance between the item identifiers within the list.

12. The computing system of claim 1, wherein the item identifiers are electronically readable identifiers comprising one of: a barcode, a near-field tag, and RFID tag.

13. The method of claim 6, wherein the item identifiers are electronically readable identifiers comprising one of: a barcode, a near-field tag, and RFID tag.

* * * * *